United States Patent [19]
Dee

[11] Patent Number: 5,212,611
[45] Date of Patent: May 18, 1993

[54] INTEGRAL READ/WRITE RECORDING HEAD WITH DUAL GAP DIMENSION

[75] Inventor: Richard H. Dee, Louisville, Colo.

[73] Assignee: Storage Technology Corporation, Louisville, Colo.

[21] Appl. No.: 731,008

[22] Filed: Jul. 16, 1991

[51] Int. Cl.[5] .............................................. G11B 5/127
[52] U.S. Cl. ..................................... 360/113; 360/110
[58] Field of Search ...................... 360/113; 338/32 R; 324/252

[56] References Cited

U.S. PATENT DOCUMENTS

| | | | |
|---|---|---|---|
| 3,840,898 | 10/1974 | Bajorek et al. | 360/113 |
| 3,908,194 | 9/1975 | Romankiw | 360/113 |
| 3,940,797 | 2/1976 | Brock et al. | 360/113 |
| 3,967,368 | 7/1976 | Brock et al. | 29/603 |
| 4,044,392 | 8/1977 | Brock et al. | 360/113 |
| 4,051,542 | 9/1977 | Kanai | 360/113 |
| 4,071,868 | 1/1978 | Kaminaka et al. | 360/113 |
| 4,150,408 | 4/1979 | Koel et al. | 360/113 |
| 4,179,720 | 12/1979 | Miura | 360/113 |
| 4,354,212 | 10/1982 | Nouchi et al. | 360/113 |
| 4,425,593 | 1/1984 | Postma | 360/113 |
| 4,523,243 | 6/1985 | Billington | 360/113 |
| 4,547,828 | 10/1985 | Bloomer | 361/86 |
| 4,599,668 | 7/1986 | Griffith | 360/113 |
| 4,617,600 | 10/1986 | Somers | 360/113 |
| 4,644,430 | 2/1987 | French | 360/113 |
| 4,685,005 | 8/1987 | Fields, Jr. | 360/53 |
| 4,797,766 | 1/1989 | Enz | 360/113 |
| 4,803,580 | 2/1989 | Mowry | 360/113 |
| 4,803,581 | 2/1989 | Kira et al. | 360/113 |
| 4,833,560 | 5/1989 | Doyle | 360/113 |
| 4,853,633 | 8/1989 | Matsumoto | 324/210 |
| 4,907,113 | 3/1990 | Mallary | 360/112 |
| 4,907,115 | 3/1990 | Ruigrok et al. | 360/113 |
| 4,939,837 | 7/1990 | Krounbi | 29/603 |
| 4,954,920 | 9/1990 | Yamada et al. | 360/113 |
| 4,967,298 | 10/1990 | Mowry | 360/113 |

Primary Examiner—Craig E. Church
Attorney, Agent, or Firm—Duft, Graziano & Forest

[57] ABSTRACT

An integral head module having read and write elements positioned in an alternating relationship. A first pole piece of the integrated head module is formed with recesses into which are positioned write coils of write elements in order to provide write gaps of a greater length than the gaps of the MR read elements which are positioned on non-recessed portions of the first pole piece. The second pole piece is then affixed to the first pole piece together with a required insulating layer in order to form gaps of a first and increased length for the write elements and of a second and shorter length for the MR read elements.

15 Claims, 2 Drawing Sheets

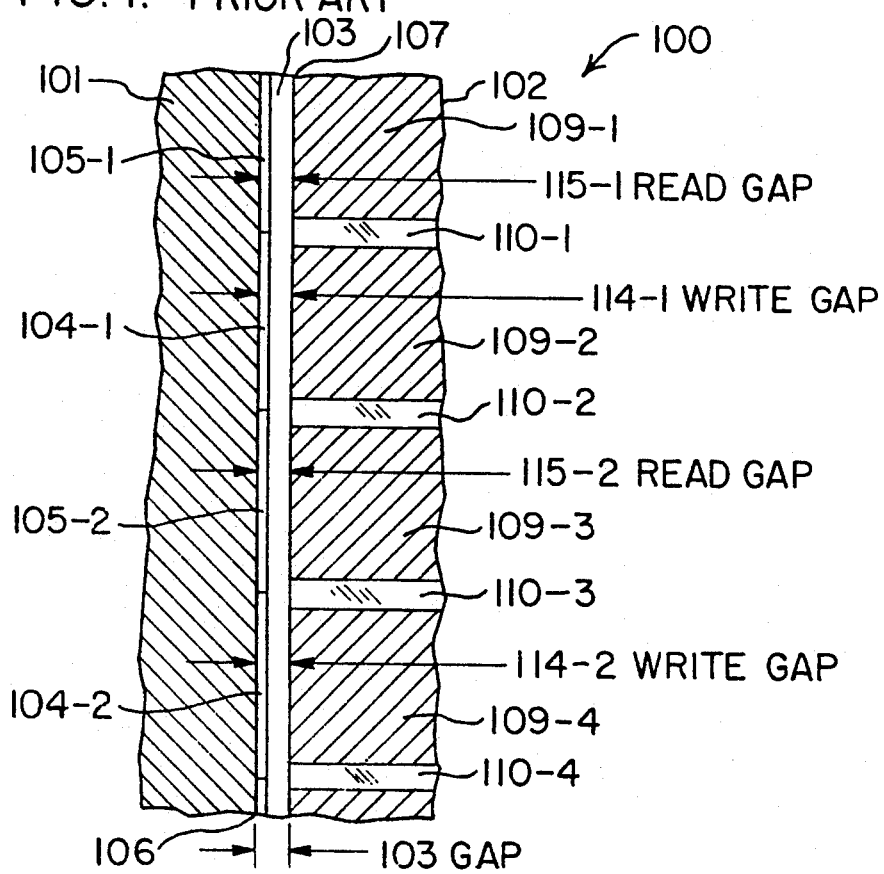
FIG. 1.—PRIOR ART
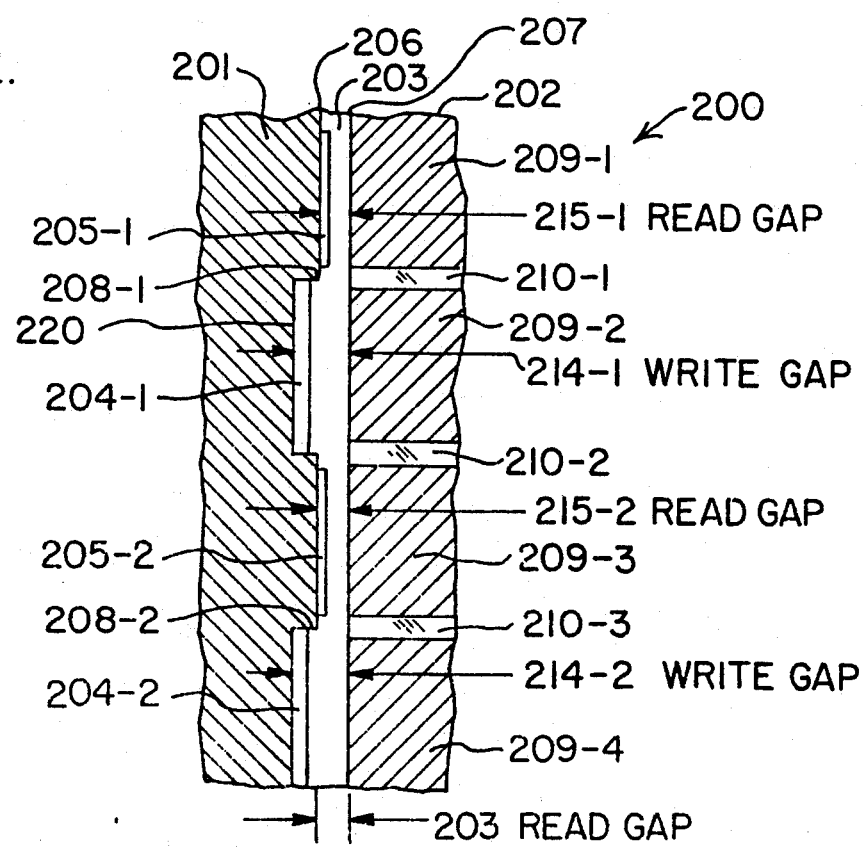
FIG. 2.

INTEGRAL READ/WRITE RECORDING HEAD WITH DUAL GAP DIMENSION

FIELD OF THE INVENTION

This invention relates to apparatus comprising and a method of manufacturing an integral magnetic recording head module having different gap dimensions for its read and write elements.

PROBLEM

It is a problem to provide an integral head module having gap lengths that are optimized for both its read and write elements. It is known that the gap length of a magnetic write element should be relatively large compared to gap length for an MR (magneto-resistive) read element. This is necessary in order to optimize the writing and reading of high density information from an associated magnetic medium such as a tape or disk. This gap length optimization is easily achievable when the read and write elements comprise separate structures since the gap length can then be optimized for the function provided by each element. However, it is often desirable to provide an MR read element and inductive write element in a single integral head module. Heretofore, it was customary to provide a single gap length for both the write and read elements of the head module. This is less than desirable since it does not provide an optimum gap length for both elements.

A prior art integral head module 100 of this type is shown in FIG. 1 as comprising a plurality of write gaps 114 and read gaps 115. Ferrite substrate pole piece 101 has inductive write windings 104 and MR read elements 105 deposited on its surface 106. The MR read elements 105 and windings 104 may be deposited on surface 106 by means of conventional thin film deposition techniques. An insulator 103 is formed over read and write elements 105 and 104 and over surface 106 before ferrite closure pole piece 102 is affixed via insulator 103 to pole piece 101. The write gap length 114 is the distance between surface 107 of pole piece 102 and surface 106 of pole piece 101. The read gap length 115 is also the distance between surfaces 106 and 107. It can be seen that the write and read gap lengths 114 and 115 are uniform over the entire structure and do not provide the relatively short gap lengths that MR read elements 105 prefer and the relatively wider gap lengths that write elements 104 prefer. This being the case, the compromise gap length is not optimum for both the read and write elements.

It is therefore seen that the presently available integral head modules are less than desirable since they do not provide gap lengths and are optimized for both their read and write elements.

SOLUTION

The above problem is solved and a technical advance is achieved by provision of an integral read/write head module, and a process of its fabrication, wherein different gap lengths are provided for the read and write elements. Relatively narrow gap lengths are provided for the MR read elements and relatively wide gap lengths are provided for the write elements.

One possible embodiment of the integral read/write head module of the invention comprises a ferrite structure having at least a single inductive write head and a single MR read head. Advantageously, the integral head module of the invention may also have a plurality of MR read elements and a plurality of inductive write elements. This is advantageous in situations where a corresponding plurality of tracks on a tape are to be read or written concurrently.

The integral head module of the invention includes a plurality of read and write elements positioned in an alternating relationship so that each read element is adjacent only a write element(s) and so that each write element is adjacent only a read element(s). Gaps of different lengths are provided by the steps of 1) defining the areas on a first pole piece that are to constitute the write elements and the read elements; 2) using photolithography processes including photoresist and masking techniques to etch away the ferrite substrate in the defined areas that are to receive the write elements so that a recess can be formed into which the conductors of the write element can be deposited; 3) depositing an insulator and MR material over all areas of the substrate 4) using photolithography techniques to etch away areas of the insulator that do not define the MR read elements; 5) etching recesses and depositing the coils of the write element and the conductors of the write element and MR element; 6) attaching leads to these elements by photo deposition techniques; 7) covering the deposited structures with insulator layers; 8) affixing a closure ferrite structure that can serve as a mating pole piece; and 9) contouring and milling the top of the formed head structure so as to expose the recess areas of the write elements so as to define the wider write gaps.

The present invention provides optimum gap lengths for both the MR read elements and the write elements so that they can provide the high density read and write operations.

BRIEF DESCRIPTION OF THE DRAWING

These and other advantages of the invention may be better understood from a reading of the following description of one possible exemplary embodiment thereof taken in conjunction with the drawing in which:

FIG. 1 discloses a prior art integral head module having adjacent read and write elements;

FIG. 2 discloses the integral head module of the present invention having adjacent read and write elements.

DETAILED DESCRIPTION OF THE DRAWING

Figure 3:
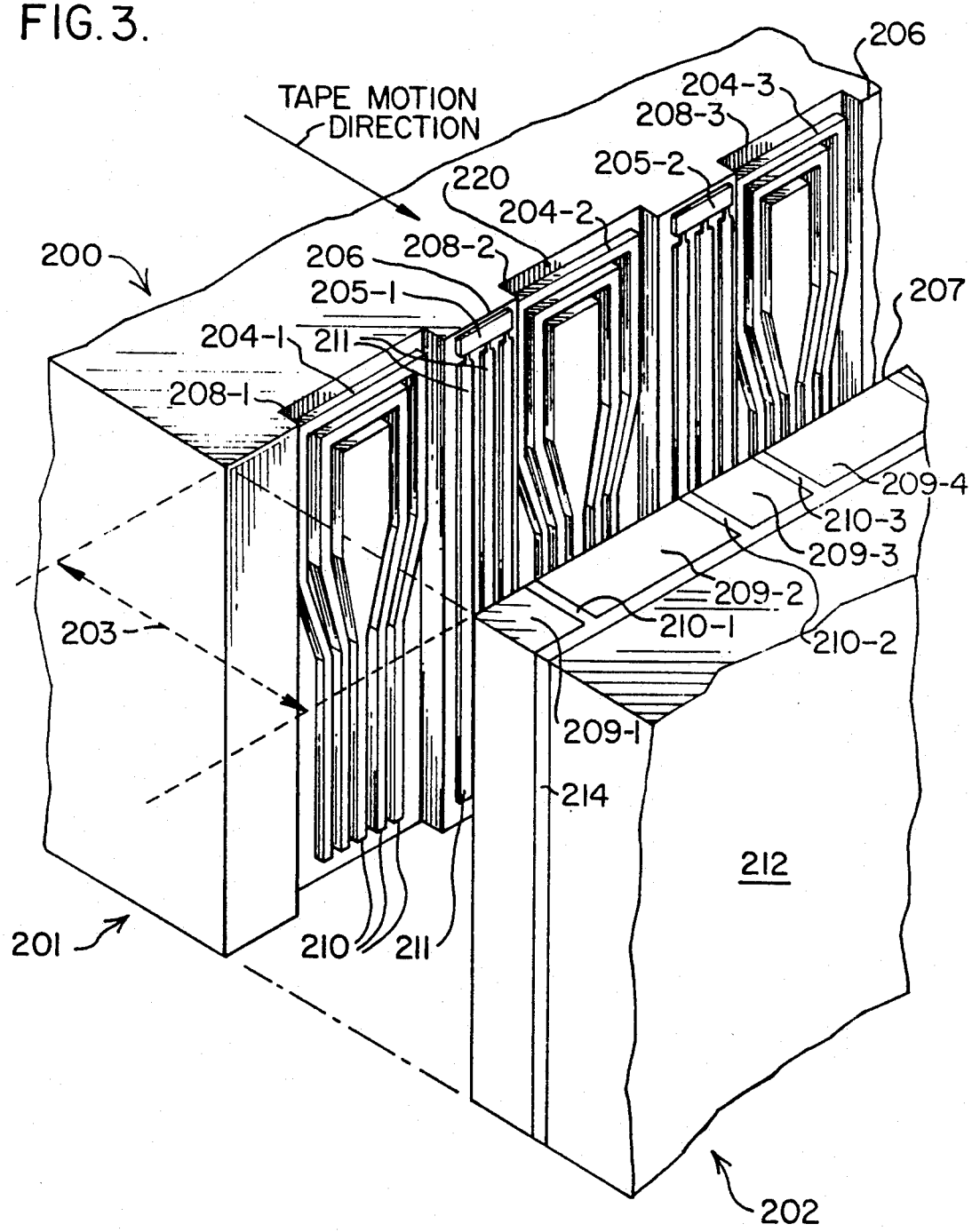
FIG. 3 discloses further details of the integral head module of the present invention.

FIG. 1 discloses a first ferrite substrate pole piece 101 positioned adjacent a second ferrite closure pole piece 102 with surface 106 of substrate 101 and surface 107 of closure 102 being positioned essentially parallel to one another. Substrate 101 contains alternating read 105 and write 104 elements and read 115 and write 114 gaps. The read 105 and write 104 elements are affixed to surface 106. MR read element 105-1 is positioned adjacent write element 104-1 followed by read element 105-2 and write element 104-2. An insulator layer 103 may be applied to the read and write elements following which the ferrite closure 102 is affixed to the insulator 103 by conventional techniques such as adhesive. The thickness of the final insulator 103 together with the distance between surfaces 106 and 107 defines the length of the gap 103. This gap 103 is of uniform length across the width of the integral head module and is of the same length for the write gaps 114 as well as for the rad gap 115. Ferrite closure pole piece 102 also contains glass separators 110 in order to isolate the different ferrite areas 109 so as to minimize flux disturbances within pole piece 102.

While the integral head module of the prior art as shown on FIG. 1 performs satisfactorily in certain applications, it is less than desirable where the high bit densities must be achieved since the length of gaps 114 and 115 is not optimum for both the read elements and the write elements.

FIG. 2 discloses one possible exemplary embodiment of the integral head module 200 of the invention. Integral head module 200 has a ferrite substrate pole piece 201 and a closure pole piece 202 with surface 206 of pole piece 201 and surface 207 of pole piece 202 being positioned substantially parallel to one another in the same manner as shown for the integral head module of FIG. 1. Pole piece 201 includes a plurality of read 205 and write 204 elements positioned in an alternating relationship with respect to each other transversely across the pole piece 201. Pole piece 201 includes a first MR read element 205-1 positioned next to a first write element 204-1; a second MR read element 205-2 positioned on the other side of write element 204-1 with another write element 204-2 being positioned on the other side of MR read element 205-2. The distances between surface 206 of pole piece 201 and surface 207 of pole piece 202 comprises the read gaps 215. The distance between recessed surface 220 of pole piece 201 and surface 207 comprises the length of the write gap 214.

Write elements 204 are positioned within recesses 208. This provides a relatively long gap write length since the distance between surfaces 207 and 220 defines the effective write gap length. Read elements 205 are deposited on surface 206 (which may include an insulator, not shown). The effective length of the read gap 215 is the distance between surfaces 207 of pole piece 202 and surface 206 of pole piece 201. It can be seen that the length of the write gaps 214 is substantially longer than is the length of the read gap 215. The structure of FIG. 2 permits the length of the write and read gaps to be optimized so as to achieve the highest possible bit densities on both read and write operations.

The ferrite closure pole piece 202 is essentially the same as that of the pole piece 102 of FIG. 1 and contains a plurality of individual ferrite areas 209 with each being separated by a glass separator 210 so as to minimize flux interference with pole piece 202. The integral head module of FIG. 2 also includes the necessary insulator layers between the various portions thereof. Only insulator 203 is specifically shown on FIG. 2 in order to simplify the complexity of the drawing.

FIG. 3 is a perspective view of integral head module 200. Shown on FIG. 3 is pole piece 201 together with a first write element 204-1, positioned next to a first read element 205-1 followed by a second write element 204-2 which is followed by a second MR read element 205-1 and in successive order, a third write element 204-3 followed by a MR read element 205-3 (not shown). The write elements 204 are each positioned within a recess 208. Leads 210 are shown affixed to write elements 204 and leads 211 are shown affixed to MR read elements 205. The ferrite closure pole piece 202 comprises a plurality of discrete ferrite areas 209 which are isolated from each other by the glass separators 210. The pole piece 202 also has a glass separator 214 which is positioned transverse to pole piece 202 and parallel to surfaces 212 and 207 of closure pole piece 202. Pole piece 202 is shown spaced apart from pole piece 201.

After the processing of pole piece 201 is completed, pole piece 202 is permanently affixed to insulator 203 of pole piece 201 by any suitable means such as, for example, an adhesive. All of the insulator layers that would comprise an operable integral head module is shown in FIG. 3 are not specifically shown thereon in order to minimize the complexity of the drawing.

TABLE 1

1. Coat mating surface of first ferrite magnetic pole piece with photoresist and expose pattern to define recess areas for write elements.
2. Etch and remove ferrite to a predetermined depth in defined recess areas.
3. Deposit insulating layer on mating surface of first pole piece including defined recess areas.
4. Deposit MR layer of such as Nickel Iron over insulator layer.
5. Coat MR layer with photoresist and expose pattern to define read element areas.
6. Etch away MR layer in areas not defining read elements to leave formed MR read elements.
7. Deposit second insulator layer over entire mating surface and MR read elements.
8. Cover second insulator layer with photoresist, mask and expose pattern to define conductors for MR element and coils and conductors of write elements.
9. Etch patterned area and deposit gold conductors to MR elements and form coils of write elements in recess areas of first pole piece.
10. Deposit third insulator layer only in recess area.
11. Juxtapose mating surfaces of first and second pole pieces.
12. Lap top of attached pole pieces to expose recess areas of write coils.

Table 1 discloses the sequence of steps used to fabricate the integral head module of the present invention.

Step 1 coats the mating surface 206 of the first ferrite magnetic pole piece 201 with photoresist and exposes a pattern to define recessed areas 220 for the write elements.

Step 2 etches the exposed photoresist and pole piece to remove the ferrite material to a predetermined depth to form recessed areas 208 to receive the write elements.

Step 3 deposits a first insulator layer on the entire mating surface 206 of pole piece 201 including the recessed areas 208 created in step 2.

Step 4 deposits MR film over first insulating layer.

Step 5 coats the MR film layer of step 4 with photoresist and exposes a pattern to define the areas for the write elements.

Step 6 etches away the MR film in the recessed areas 208 for the defined write elements 204. This leaves MR film in the read areas for the MR read elements 205.

Step 7 deposits a second insulating layer 203 over the mating surface of pole piece 201 including the formed MR read elements.

Step 8 covers the second insulating layer with photoresist and exposes a pattern to define conductors that are to be attached to the formed MR elements and to define the coils and conductors of the write elements 204.

Step 9 etches the patterned areas of step 8 and deposits conductors on the MR elements and deposits metal to form the coils and conductors of the write elements.

Step 10 deposits a third insulating layer 203 over the formed write coils and conductors in recessed areas only.

Step 11 juxtaposes and affixes together the mating surfaces of pole piece to insulator 203 of pole piece 201.

Step 12 laps the top surfaces of the attached pole pieces to expose the recessed areas of the write elements to define write gaps that of a greater length than are the gap lengths for the MR read elements.

It is seen that the integral head module of the present invention provides an integral head module having read and write elements with optimum gap lengths for reading and writing of data having high bit densities.

While a specific embodiment of this invention has been disclosed, it is expected that those skilled in the art can and will design alternate embodiments of this invention that fall within the scope of the appended claims. Thus, the head of the invention may cooperate with any magnetic medium such as a tape, or disk, etc.

I claim:

1. An integral head module having at least one MR read element and one write element, said module comprising:
   a first pole piece having a first mating surface,
   a recess having an inner wall in said first mating surface,
   a write element positioned in said recess,
   an MR read element affixed to a first insulator layer on said first mating surface adjacent said recess, and
   a second pole piece having a second mating surface,
   said second pole piece being positioned adjacent said first pole piece to define a read gap of a length equal to the distance between said first and second mating surfaces and to define a write gap of a length equal to the distance between said second mating surface and said inner wall.

2. The head module of claim 1 wherein said
   first insulator layer is deposited on said first mating surface as well as on said inner wall of said recess for isolating said MR read element from said first mating surface and for isolating said write element from said inner wall of said recess, and wherein said module further comprises:
   a second insulator layer for isolating said second mating surface from said MR read element and said write element when said second pole piece is positioned adjacent said first mating surface.

3. The module of claim 1 wherein said module further comprises:
   a second write element positioned in a second recess in said first mating surface,
   a second MR read element positioned on said first insulator layer, and
   said MR read elements and said write elements being positioned in an alternating relationship so that each of said MR elements is positioned so as to be adjacent to only a recess containing a write element and so that each of said recesses is positioned so as to be adjacent to only an MR read element.

4. An integral head module having a plurality of MR read elements and a plurality of write elements arranged in an alternating relationship across said module so that each MR read element is not adjacent another MR read element and so that each write element is not adjacent another write element, said module comprising:
   a first pole piece having a first mating surface,
   a plurality of recess spaced apart from each other in said first mating surface,
   an inner wall in each recess,
   a write element positioned in each of said recesses,
   a plurality of MR read elements spaced apart from each other and affixed via a first insulator layer to said first mating surface so that each of said MR elements is separated from another MR element by at least one of said write elements,
   a second pole piece having a second mating surface, and
   said second pole piece being positioned adjacent said first pole piece to define a read gap for each MR read element having a length equal to the distance between said first and second mating surfaces and to define a write gap for each write element having a length equal to the distance between said second mating surface and said inner wall of each recess.

5. The head module of claim 4 wherein
   said first insulator layer is deposited on said first mating surface and on said inner wall of said recesses for isolating said MR read element from said first mating surface and for isolating said write elements from said inner wall of said recesses, and wherein said module further comprises:
   a second insulator layer on said MR read elements and on said write elements for isolating said second mating surface from said MR read elements and said write elements.

6. An integral head module having a plurality of MR read elements and a plurality of inductive write elements adapted to read and write data from and to a magnetic medium positioned above said module, said MR read elements and said inductive write elements being arranged in an alternating relationship across said module so that each MR read element is not adjacent another MR read element and so that each inductive write element is not adjacent another inductive write element, said module comprising:
   a first pole piece having a first mating surface perpendicular to a lower flat surface of said magnetic medium,
   a plurality of recesses spaced apart from each other in said first mating surface and having an inner wall substantially parallel to said first mating surface,
   an inductive write winding formed in each of said recesses,
   a plurality of MR read elements spaced apart from each other and affixed to said first mating surface by a first insulator layer,
   a second pole piece having a second mating surface, and
   said second pole piece being attached via a second insulator layer to said first pole piece to define a read gap for each MR read element having a length equal to the distance between said first and second mating surfaces and to define a write gap having a length equal to the distance between said second mating surface and said inner wall.

7. The head module of claim 6 wherein
   said first insulator layer is formed on said first mating surface and on said inner wall of said recesses for isolating said MR read elements from said first mating surface and for isolating said inductive write windings from said inner wall of said recesses, and
   said second insulator layer is formed on said MR read elements and on said inductive write windings for isolating said second mating surface from said MR read elements and said windings.

8. A method of forming an integral head module having at least one MR read element and one write element, said method comprising the steps of:

forming a recess in a first mating surface of a first pole piece, forming a write element in said recess, affixing an MR read element to a first insulator layer on said first mating surface adjacent said recess, and attaching a second pole piece having a second mating surface via a second insulator layer to said first pole piece to define a read gap having a length equal to the distance between said first and second mating surfaces and to define a write gap having a length equal to the distance between said second mating surface and an inner wall of said recess.

9. The method of claim 8 wherein said first insulator layer is deposited on said first mating surface and on an inner wall of said recess for isolating said MR read element from said first mating surface and for isolating said write element from said inner wall of said recess, and wherein said method further comprises the step of:

depositing said second insulator layer on said MR read element and on said write element for isolating said second mating surface from said MR read element and said winding.

10. The method of claim 9 wherein said method further comprises the steps of:

forming a second recess in said first mating surface, forming a second write element in said second recess, forming a second MR read element on said first insulator layer, and each of said MR read elements being positioned on said first insulator layer so as to be adjacent to only a recess containing a write element and each of said recesses being positioned so as to be adjacent to only an MR read element.

11. A method of forming an integral head module having a plurality of MR read elements and a plurality of write elements arranged in an alternating relationship across said module so that each MR read element is not adjacent another MR read element and so that each write element is not adjacent another write element, said method comprising the steps of:

forming a plurality of recess spaced apart from each other in a first mating surface of a first pole piece, forming a write element in each of said recesses, forming a plurality of MR read elements spaced apart from each other on a first insulator layer on said first mating surface, attaching a second pole piece having a second mating surface via a second insulator layer to said first pole piece to define a read gap for each MR read element having a length equal to the distance between said first and second mating surfaces and to define a write gap for each write element having a length equal to the distance between said second mating surface and an inner wall of said recesses.

12. The method of claim 11 wherein said first insulator layer is deposited on said first mating surface and on said inner wall of said recess parallel to said first mating surface for isolating said MR read elements from said first mating surface and for isolating said write elements from said inner wall of said recess, and wherein said method further comprises the step of:

forming said second insulator layer on said MR read element and on said write element for isolating said second mating surface from said MR read element and said write element.

13. A method of forming an integral head module having a plurality of MR read elements and a plurality of inductive write elements adapted to read and write data from and to a magnetic medium positioned above said module, said MR read elements and said inductive write head being arranged in an alternating relationship across said module so that each MR read element is not adjacent another MR read element and so that each inductive write element is not adjacent another inductive write element, said method comprising the steps of:

forming a plurality of recesses spaced apart from each other in said first mating surface of a first pole piece perpendicular to a lower flat surface of said magnetic medium, said recesses having an inner wall substantially parallel to said first mating surface, forming an inductive write winding of said write elements in each of said recesses, forming a plurality of MR read elements spaced apart from each other and affixed to a first insulator layer on said first mating surface, attaching a second pole piece having a second mating surface via a second insulator layer to said first pole piece to define a read gap for each MR read element having a length equal to the distance between said first and second mating surfaces and to define a write gap for each inductive write element having a length equal to the distance between said second mating surface and said inner wall.

14. The method of claim 13 wherein said first insulator layer is deposited on said first mating surface and on said inner wall of said recess parallel to said first mating surface for isolating said MR read elements from said first mating surface and for isolating said inductive write windings from said inner wall of said recesses, and wherein said method further comprises the step of:

forming said second insulator layer on said MR read elements and on said inductive write windings for isolating said second mating surface from said MR read elements and said inductive write windings.

15. A method of forming an integral head module having a plurality of MR read elements and a plurality of inductive write elements arranged in an alternating relationship across said module so that each MR read element is not adjacent another MR read element and so that each inductive write element is not adjacent another inductive write element, said method comprising the steps of:

forming a plurality of parallel recesses spaced apart from each other in a first mating surface of first pole piece, forming a first insulator layer on said first mating surface and on an inner wall of each recess parallel to said first mating surface, depositing an inductive write winding on said first insulator layer in each of said recesses, depositing a plurality of MR read elements arranged parallel to and spaced apart from each other on said first insulator layer on said first mating surface, depositing a second insulator layer on said MR read elements and on said inductive write windings, and attaching a second pole piece having a second mating surface to said second insulator layer to define a read gap for each MR read element having a length equal to the distance between said first and second mating surfaces and to define a write gap for each inductive write element having a length equal to the distance between said second mating surface and said inner wall.

* * * * *